Jan. 18, 1966  E. A. ARP  3,229,880
STAMP DISPENSING MACHINE
Filed Jan. 20, 1964  10 Sheets-Sheet 1

INVENTOR.
EWALD A. ARP
BY
Braddock and Braddock
ATTORNEYS

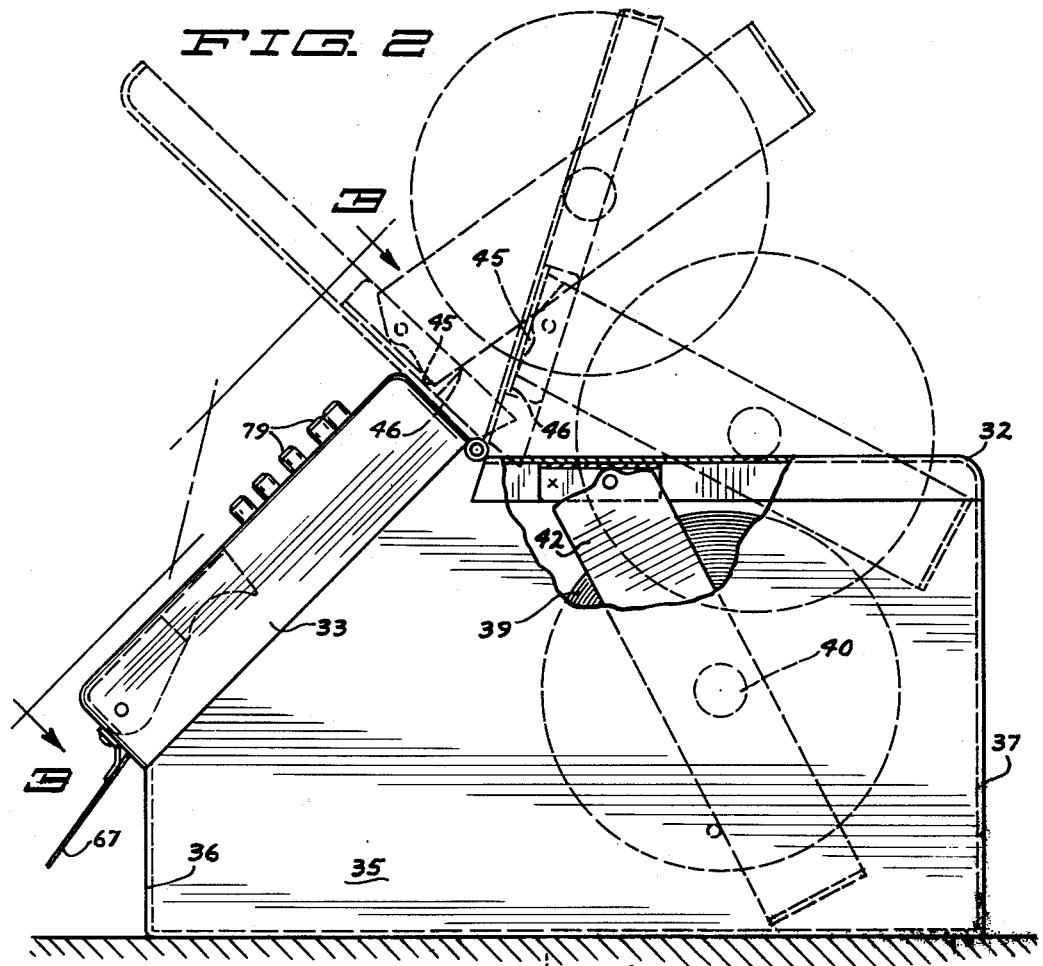
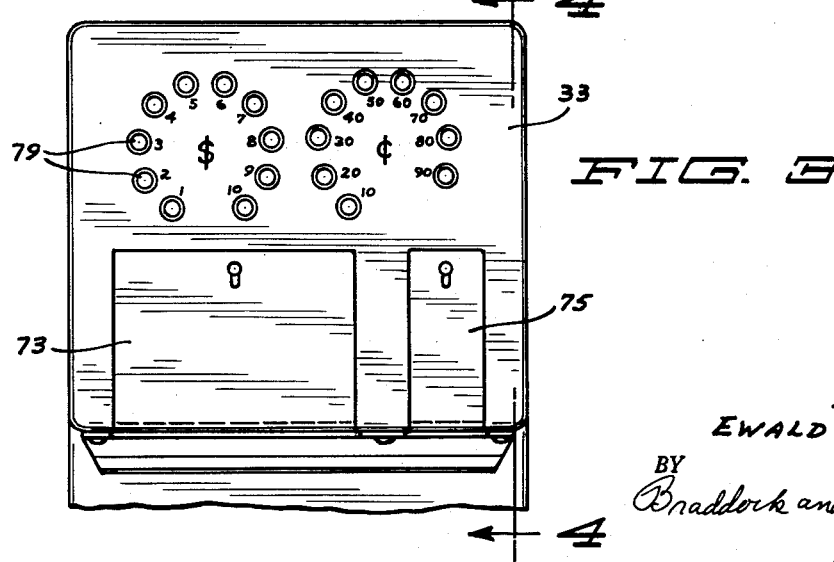

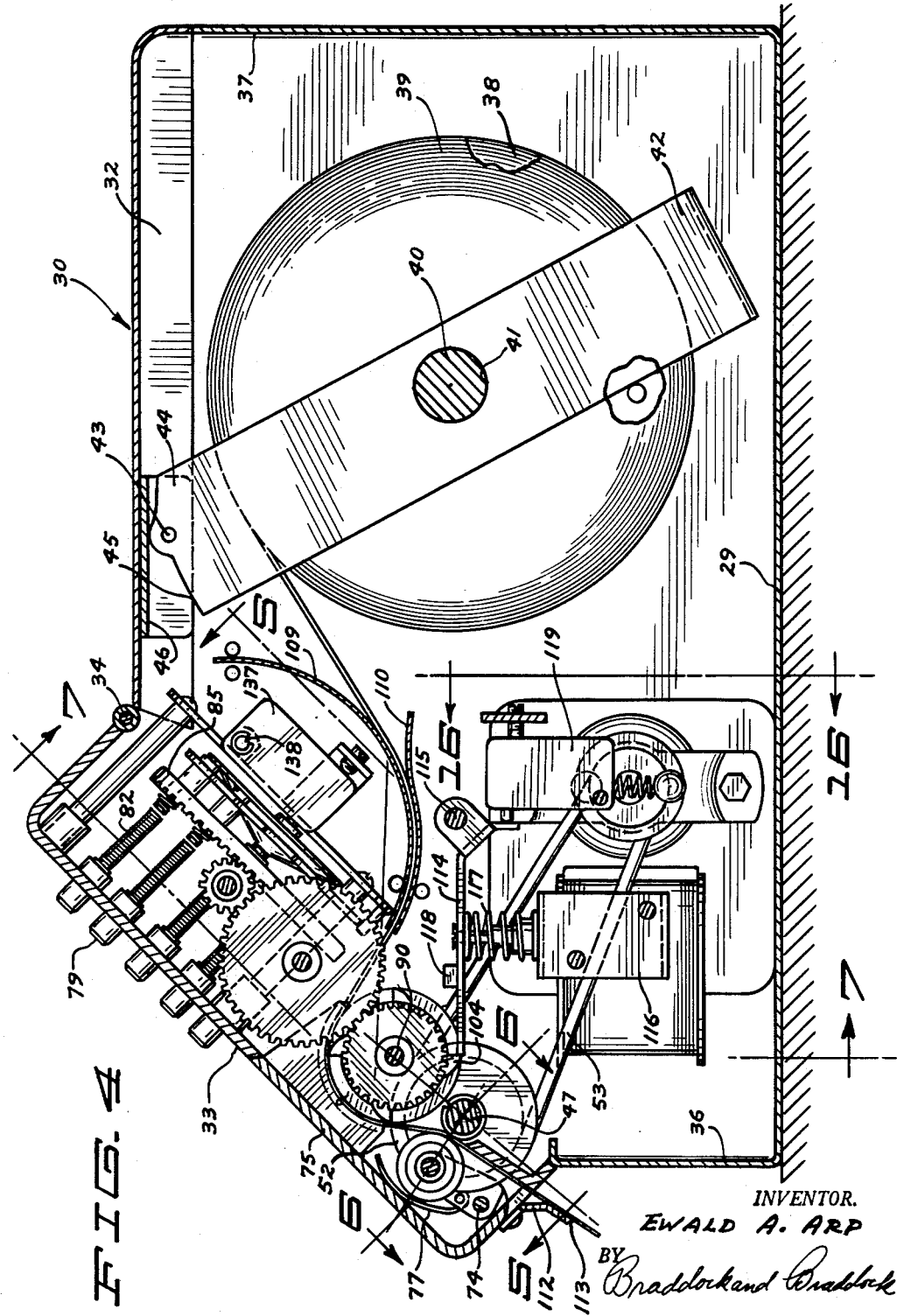

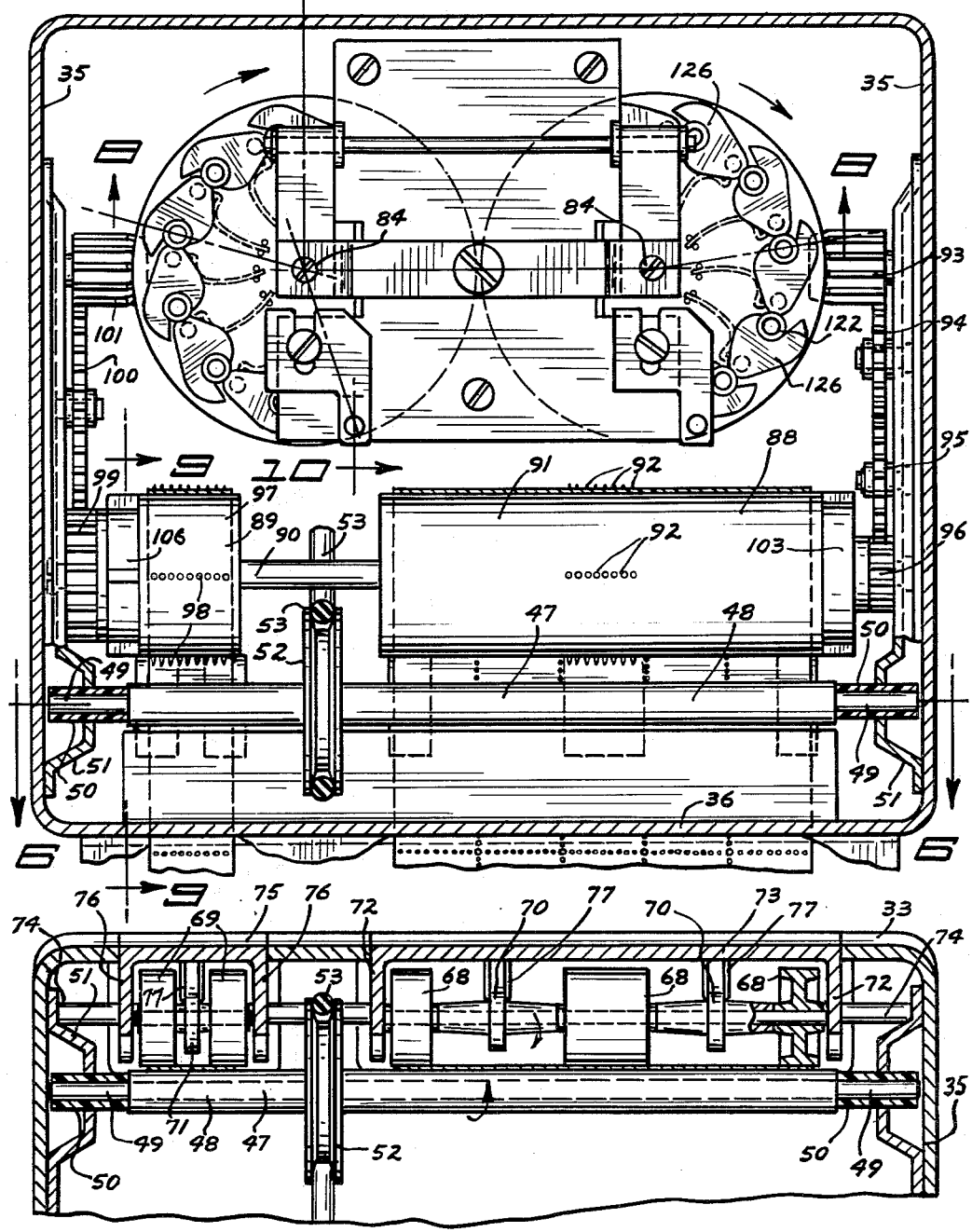

Jan. 18, 1966 E. A. ARP 3,229,880
STAMP DISPENSING MACHINE
Filed Jan. 20, 1964 10 Sheets-Sheet 5

INVENTOR.
EWALD A. ARP
BY Braddock and Braddock
ATTORNEYS

Jan. 18, 1966  E. A. ARP  3,229,880

STAMP DISPENSING MACHINE

Filed Jan. 20, 1964  10 Sheets-Sheet 6

INVENTOR.
EWALD A. ARP
BY
Braddock and Braddock
ATTORNEYS

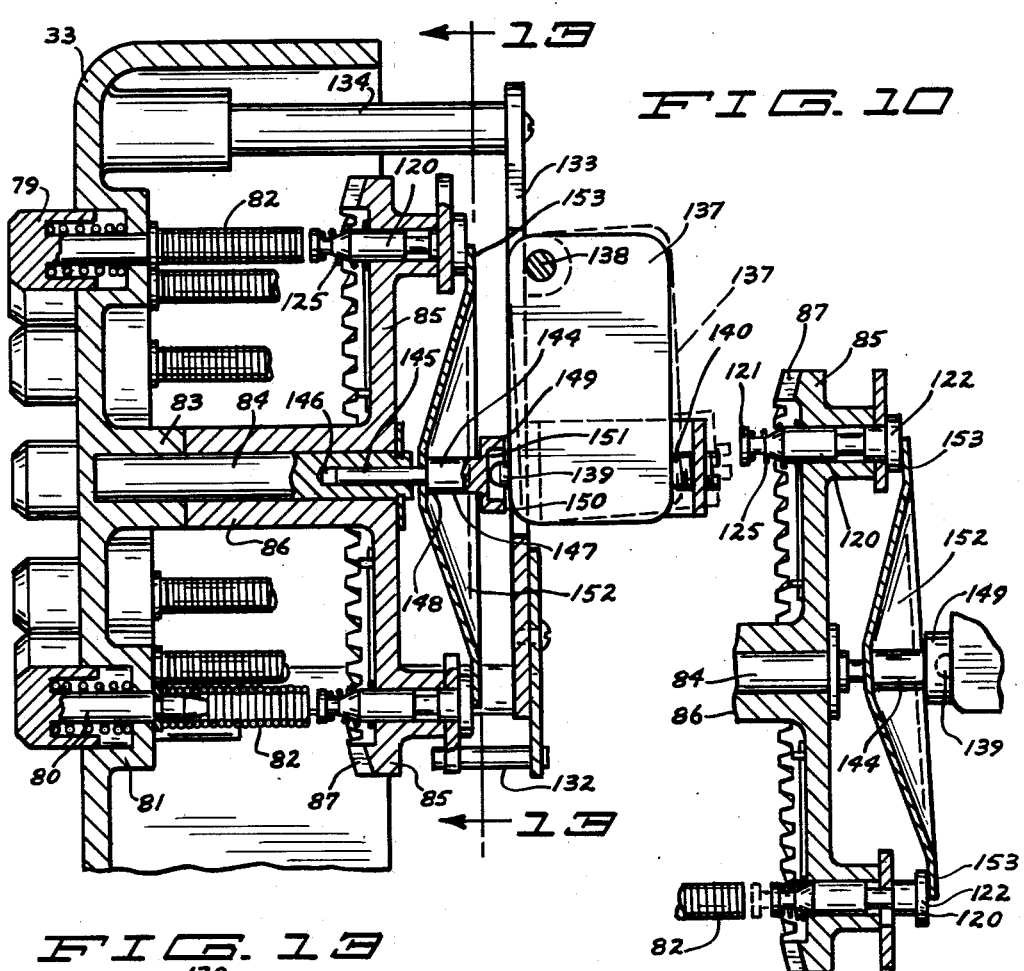

Jan. 18, 1966 E. A. ARP 3,229,880
STAMP DISPENSING MACHINE
Filed Jan. 20, 1964 10 Sheets-Sheet 8
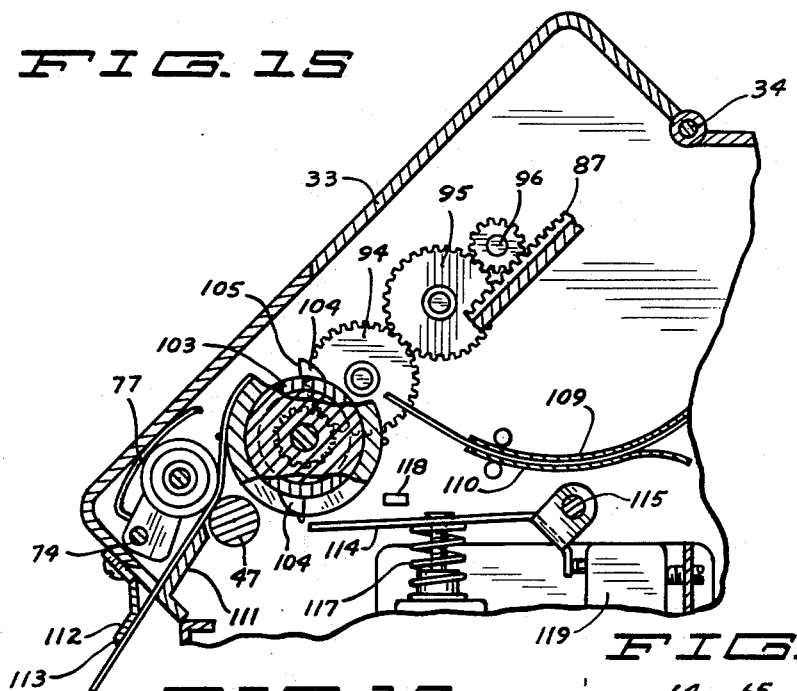
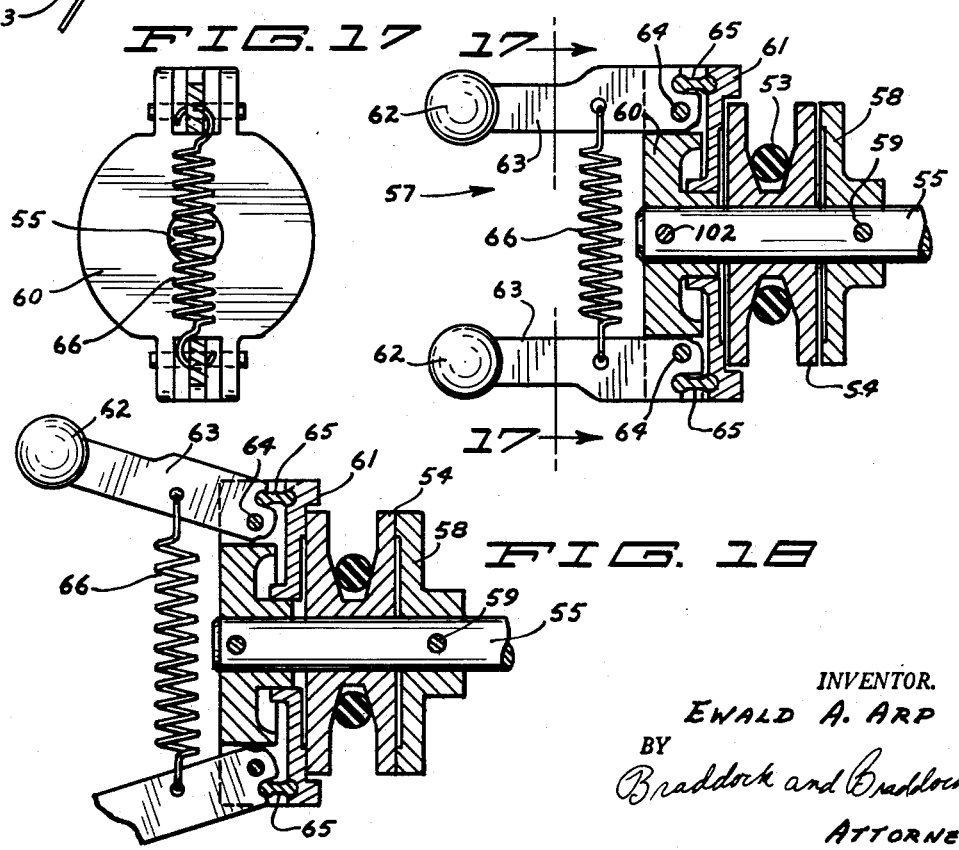
INVENTOR.
EWALD A. ARP
BY
Braddock and Braddock
ATTORNEYS

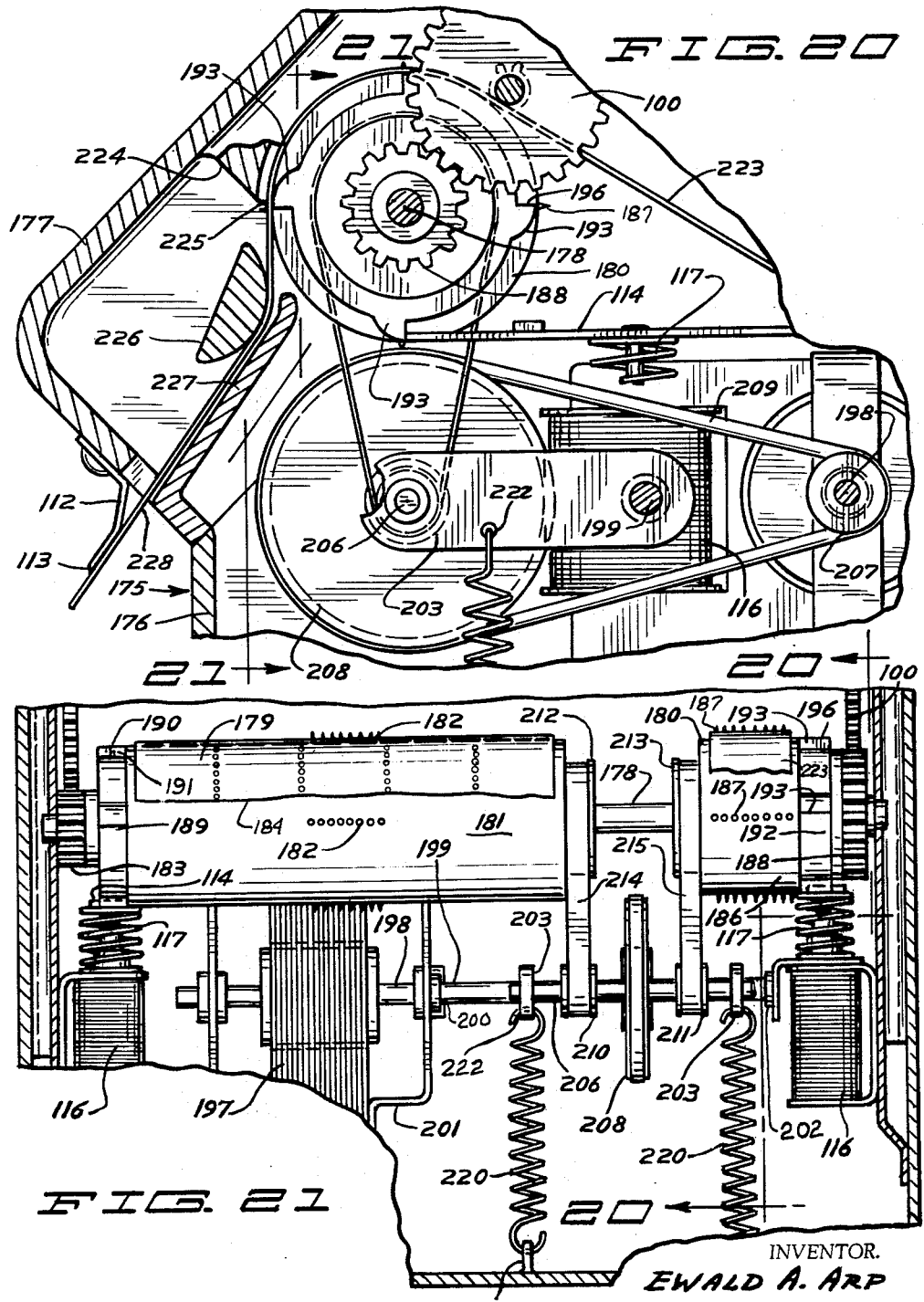

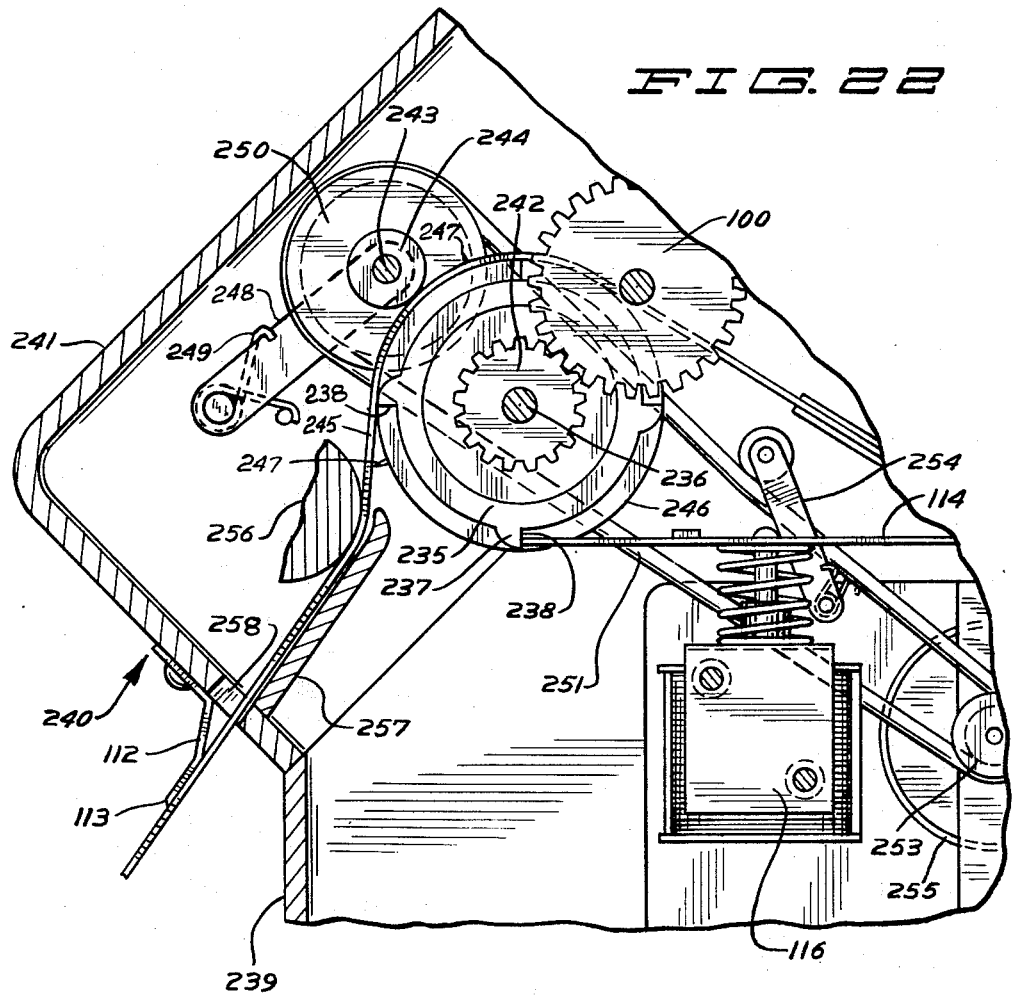

United States Patent Office 3,229,880
Patented Jan. 18, 1966

1

3,229,880
STAMP DISPENSING MACHINE
Ewald A. Arp, Hopkins, Minn., assignor of one-third to Arnold W. G. Larson and one-third to Sheldon D. Moody, both of Minneapolis, Minn.
Filed Jan. 20, 1964, Ser. No. 340,853
17 Claims. (Cl. 226—109)

This invention has relation to machines for dispensing stamps and more particularly to machines which will deliver from continuous rolls of stamps any number of desired stamps.

This application is a continuation-in-part of my copending application, Serial No. 857,814, filed December 7, 1959, for Stamp Dispensing Machine.

Devices made according to the invention will find use wherever it is desirable to dispense quantities of stamps as unseparated units, for example, including dispensing of postage stamps on order from a post office window, but such devices will probably find their greatest use in dispensing trading stamps at high traffic locations such as checkout counters of supermarkets. While such machines may be designed to feed stamps from one roll only, many such machines will be capable of delivering stamps from two or more rolls.

Inasmuch as a relatively large number of stamp dispensing machines made according to the invention will be necessarily utilized in dispensing trading stamps or the like, it is essential that the cost of manufacture be kept at an absolute minimum in order to prevent the capital outlay from being prohibitive.

Stamp dispensing machines have been proposed in the past which utilize positively driven feed rolls having pins for engaging the perforations in the stamp strips to be dispensed. Such machines utilize these feed roll pins to drive the stamps from a stored roll of stamps to the exterior of the machine. This has proved unsatisfactory inasmuch as the very considerable inertia of the stamp roll must be overcome whenever stamps are initially pulled from the stamp roll and such positively driven feed rolls tend to tear the paper of the stamp strips by elongating the perforations therein. Further, there is a tendency for the pins to pull forward out of the perforations before the momentum of the stamp roll is built up, thus to leave the next set of perforations lagging at least slightly with respect to the next set of pins. Inasmuch as this positive drive of the stamp through the machine by the feed roll and feed roll pins must necessarily exert a very considerable initial impact on the strip of stamps between the feed roll and the stamp roll when the stamp roll is at rest, it is not uncommon for this stamp strip to become partially torn or even entirely separate from the stamp roll at position between the feed roll and the roll of stamps.

In a device made according to the present invention, however, all of these difficulties are overcome by providing for initial slippage between at least two elements of the drive train between a drive motor and the elongated stamp strip as the inertia of the stamp roll is being overcome. For example in a first form of the invention, this slippage can be provided between the stamp strip itself and the last drive element by providing a friction drive roller or shaft in slippable driving contact with one side of said strip backed up with a suitable idler roller on the other side thereof. In this form of the invention, a counter drum is provided between a roll of stamps and the friction drive roller and this counter drum has banks of pins adapted to receive the transverse rolls of perforations on the stamps to be dispensed. When the machine is activated to dispense stamps, the friction roller is caused to be rotated by the drive motor, and initially can be ex-

2 pected to spin over the surface of the stamps being dispensed while at the same time applying a force to them tending to put the stamp roll into motion. As the stamp roll inertia is overcome, the stamps will move at more nearly the peripheral speed of the friction roller. The counter drum will be driven by the stamp strip, and is used to "count" the number of stamps passing onto and off of the drum. When the prescribed number of stamps has thus been counted, movement of the counter drum is positively terminated while the friction roller is still tending to drive the stamps through the machine. When the stamps come to a stop because of the stopping of the counter drum, the friction roller will simply spin over the surface of the stamps until the energy causing it to rotate is removed and dissipated.

In other forms of the invention, this initial slippage is provided for by insertion of a slippage linkage between the counter drum and the drive motor and the counter drum acting through its pins extending through perforations in the stamp strip is used to pull the stamp strip from the stamp roll. This linkage can consist of a flat belt extending between suitable pulleys and tensioned to be slippable over one or both of said pulleys before sufficient force is transmitted to the strip to tear the stamps while at the same time transmitting sufficient force to start the strip and stamp roll moving. Such an arrangement is illustrated and described herein. Other such slippage linkages can be provided within the spirit of the invention and the scope of the claims which follow.

Also illustrated is an arrangement whereby the counter drum and the stamp strip are driven by a friction drive roller in contact with one side of said strip at a point where the other side of said strip is supported by the counter drum. In this form of the invention, the counter drum also performs the function of the idler roller disclosed in the first form of the invention.

In all forms of the invention, the slippage linkages between the stamp strips and the drive motors provide an arrangement whereby a single drive motor may be employed to drive more than one stamp strip through the machine. In such an arrangement, where a prescribed number of stamps are to be dispensed from a first strip a counter drum associated with said first strip is allowed to rotate to "count" the number of stamps passing onto and off of the drum until the prescribed number has been counted, and then movement of the drum is positively terminated. This terminates feed of the stamps from the first strip through the machine regardless of whether the drive motor is still operating; and if said motor is still operating the slippage linkage simply slips until the motor stops. In the situation where no stamps are to be dispensed from a second strip during the dispensing of stamps from the first strip, a counter drum associated with the second strip is not allowed to rotate and the slippage linkage between the single drive motor and the second stamp strip slips until the motor stops. Should stamps be desired from the first and second strips at the same time, the motor will operate to begin dispensing from one of the strips and will continue to operate at least until stamps from both of said strips are dispensed. The slippage linkages will operate in each case whenever stamps are not being dispensed from the particular strip at the peripheral speed of the feeding drum or roller.

It is among the objects of this invention to provide a stamp dispensing machine wherein the force exerted on the stamps being dispensed will not tear or distort said stamps.

A further object is to provide a machine having a single stamp drive motor which will dispense stamps from at least two different elongated strips thereof.

In the drawings,

FIG. 2 is an enlarged side elevational view of said machine substantially as seen from the right in FIG. 1 with parts in section and parts broken away;

FIG. 3 is a plan view of the operating panel of this machine taken on the line 3—3 in FIG. 2;

FIG. 4 is an enlarged vertical sectional view taken as on line 4—4 in FIG. 3;

FIG. 5 is a further enlarged sectional view taken on the line 5—5 in FIG. 4;

FIG. 6 is a sectional view taken on the line 6—6 in FIG. 4 and in FIG. 5;

FIG. 10 is an enlarged sectional view taken on the line 10—10 in FIG. 5;

FIG. 11 is also a sectional view taken on the line 10—10 in FIG. 5, but showing a portion only of what is shown in FIG. 10 and also showing the parts in a somewhat different position;

FIG. 13 is a sectional view taken on the line 13—13 in FIG. 10;

FIG. 14 is a fragmentary perspective view showing the relationship between one of the latch pins and its associated resiliently biased latch;

FIG. 15 is a vertical sectional view taken on the line 15—15 in FIG. 7;

FIG. 16 is an enlarged sectional view taken on the line 16—16 in FIG. 4;

FIG. 17 is a sectional view taken on the line 17—17 in FIG. 16;

FIG. 18 is also a sectional view taken on the line 16—16 in FIG. 4, but showing the parts differently positioned;

FIG. 20 is a sectional view of a second form of the present invention illustrating a belt drive slippage linkage and taken on substantially the same line of sight as FIG. 9, and as on line 20—20 in FIG. 21;

FIG. 21 is a front sectional view of the second form of the present invention taken as on line 21—21 in FIG. 20; and FIG. 22 is a vertical sectional view of a third form of the present invention taken on substantially the same line as FIG. 20 and showing a further modified form of the slippage linkage.

Figure 1:
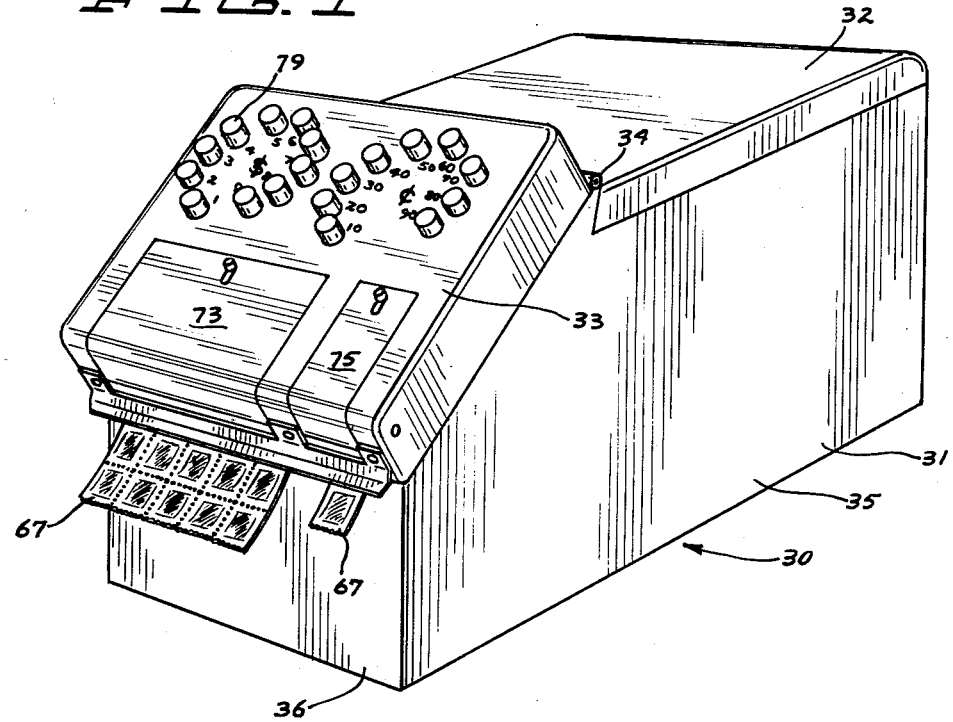
FIG. 1 is a perspective view showing the outside of a stamp dispensing machine made according to a first form of the present invention.

Referring to a first form of the invention as illustrated in FIGS. 1 through 19 of the drawings, a stamp dispensing machine 30 includes an outer case 31. Said outer case 31 includes a bottom plate 29, side plates 35, 35, front end plate 36, rear end plate 37, and an operating panel 33 having mutually perpendicular top, front, side and rear walls, all disposed obliquely to the remainder of the case. A stamp access cover 32 is pivotally mounted, as at 34, with respect to side plates 35, 35.

Mechanism for supporting a five-wide stamp roll 38 and a single width stamp roll 39 includes a stamp roll supporting rod 40 which is freely slidable in an opening 41 in a pair of rod supporting arms 42, 42 which in turn are pivotally mounted as at 43 in the stamp access cover 32. An end portion 44 of each of the supporting arms is cut away to provide a surface 45 which is initially spaced from an under surface 46 of said cover 32 so that as said cover is initially rotated about its pivot point 34, there will be a change in the annular relationship of said arms 42, 42 with respect to said cover about the pivot 43. As the cover is further opened, this end surface 45 of each arm will come in contact with said undersurface 46 of said cover, thus to prevent further angular displacement of said arms 42, 42 with respect to said cover. Movement of the cover in upward direction from that point on will cause the stamp rolls to be elevated. This relationship is perhaps best seen in the series of dotted line disclosures in FIG. 2, and results, as will be understood, in the utilization of the minimum of space permissible with easy assembly of said stamp rolls into said machine.

As pointed out above, the stamp roll supporting rod 40 can be easily moved longitudinally into clearing relation to the space between the arms 42, 42 to allow removal of the bobbins from expended stamp rolls and for introduction of new stamp rolls.

When the new stamp rolls are put on the machine, and the machine is properly threaded as will be described, the cover 32 will again be lowered to its closed position, and reverse action on the part of the arms 42, 42 will lower the rolls into the proper place.

A drive assembly includes a stamp strip drive shaft 47 having a cylindrical driving surface 48 extending along a central portion thereof and reduced end portions 49, 49 which are encircled with nylon bushings 50, 50. These bushings are rotatably mounted with respect to side plates 35, 35 as at 51. A driven pulley 52 is keyed to the stamp strip drive shaft 47, and carries a drive belt 53 which is driven by a clutch controlled drive pulley 54 mounted on a motor shaft 55 of an electric motor 56.

A clutch mechanism, indicated generally at 57 is for causing the drive pulley 54 to rotate with the motor shaft 55 only after the motor 56 has developed sufficient driving power and, consequently, has reached a predetermined speed. The clutch mechanism includes a fixed clutch plate 58 keyed to the motor shaft 55 as at 59 between the drive pulley 54 and the motor 55, and a centrifugal weight supporting hub 60 keyed to the motor shaft 55 at a side of the drive pulley spaced from said motor 56 as at 102. A slidable clutch plate 61 is mounted on said hub 60 to have sliding, longitudinal movement with respect to said motor shaft 55 and to be concentric therewith. Centrifugal weights 62, 62 are supported at outer ends of crank arms 63, 63, and inner ends of said arms are pivoted with respect to the hub 60 as at 64. Thrust links 65, 65 are situated between said crank arms 63, 63 and said slidable clutch plate 61 in position to transmit the radially outward movement and the force of the weights 62, 62 to said plate 61 in longitudinal direction with respect to said motor shaft 55. This "traps" the drive pulley 54 between said clutch plates and causes it to rotate with rotation of the motor 56 and motor shaft 55.

A spring 66, attached to the crank arms 63, 63 at position spaced outwardly from pivot point 64 tends to cause these arms to move to position as seen in FIG. 16, thus to allow the motor shaft 55 to rotate freely without having any appreciable driving affect on the drive pulley 54.

Figure 9:
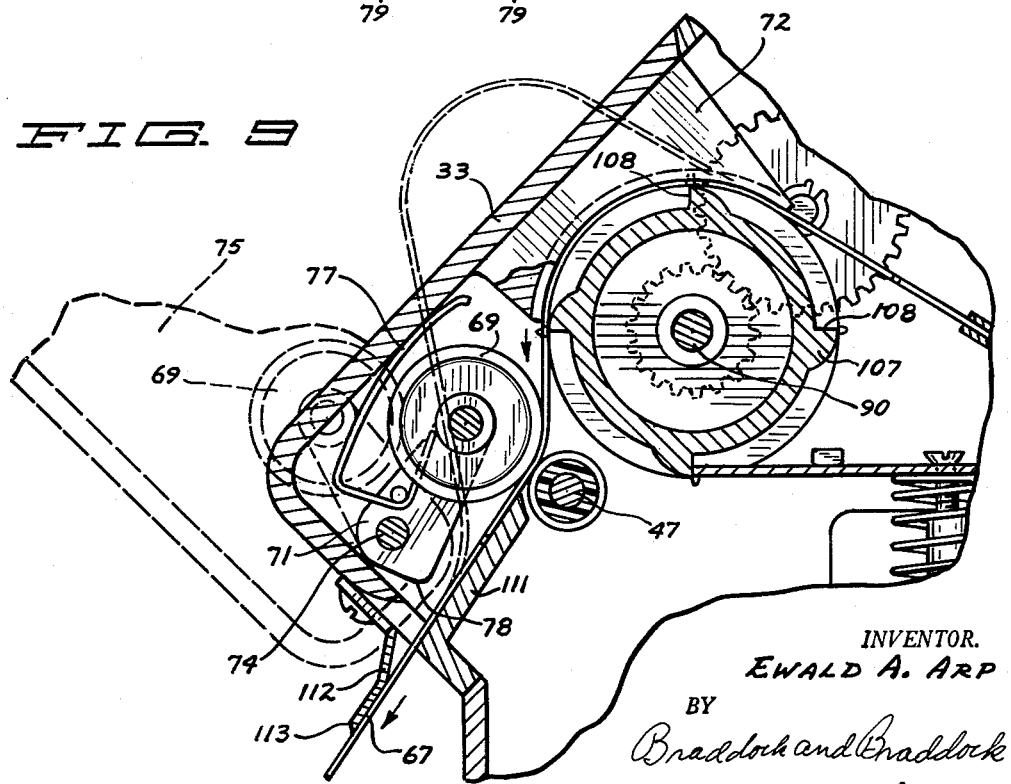
FIG. 9 is an enlarged vertical view taken on the line 9—9 in FIG. 5.

As perhaps best seen in FIG. 9, the operating path for perforated strip 67 of unsevered stamps from the rolls 38 and 39 is between the stamp strip drive shaft 47 and the operating panel 33. The stamp strips 67 are held in contacting, drive receiving relationship to said drive shaft 47 by a plurality of pressure transmitting idler rollers 68 and 69 operative on the five-wide stamp roll 38 and the single width stamp roll 39, respectively. As will probably best be seen from FIG. 9, these idler rollers 68 and 69 are rotatably supported on idler supporting arms 70, 70 and idler supporting arms 71, respectively. The arms 70, 70 are pivotally mounted between sidewalls 72, 72 of a door 73 on a common axle pin 74 which extends entirely across the machine and is mounted in opposite sidewalls 35, 35. The idler supporting arm 71 is likewise pivotally mounted with respect to asid axle pin 74 between sidewalls 76, 76 of a door 75. Said sidewalls 76, 76 are also pivotally mounted on said axle pin 74.

As perhaps seen best in FIG. 4, resilient members 77 bear against an inner surface of said door 73 and said door 75 and against said idler supporting arms 70 and 71 to tend to rotate said idler rollers 68 and 69 about said axle pin 74 in direction toward contact with the drive shaft 47. Surfaces 78 at an end of the arm 71 and at ends of arms 70, 70 are positioned so that said arms will be clear of bearing relationship with a lower inner surface of said doors when said doors are in a closed position as seen in FIG. 4 and FIG. 9, but so that said surfaces 78 of said arms will contact said inner surfaces of said doors when said doors are raised, for example, to the dotted position as seen in FIG. 9, thus to cause the idler rollers 68 and 69 to be lifted into clearing relation with said drive shaft as seen in dotted lines in FIG. 9.

The tension existing between the idler rollers and the drive shaft, as provided by resilient members 77, and the character of the surface of the drive shaft will be such that when the motor is running and a perforated strip 67 of stamps extends between said idlers and said drive shaft, and said doors are closed to cause the idlers to be positioned in direction down toward said drive shaft, then interruption of the feed of the perforated stamp strip 67 from the roll will not cause said strip to be damaged but will simply allow said drive shaft to spin on the surface of said strip.

The control mechanism of the stamp dispensing machine 30 includes a first bank of controls for the five-wide stamp roll 38 and a second bank of controls for the single width stamp roll 39. The various elements of these two banks of controls are substantially identical in character with the exception of the fact that the feed mechanism on the five-wide roll is such that stamps are dispensed in multiples of two in longitudinal direction to result in a total stamp output from said roll which is always a multiple of ten stamps; whereas the feed mechanism on the single width roll is such that the output from the machine can be any integer selected.

For the most part, identical parts on the first and second banks will be numbered identically.

Each of the first and second control banks include a plurality of control buttons 79 slidably mounted with respect to the operating panel 33 and each of these buttons is urged toward its uppermost or outermost position through the instrumentality of a spring 80 located in a housing 81 on a rear surface of the operating panel, as best seen in FIG. 10. Extending away from each such control button 79 on the inside of the control panel is a resilient control column 82. It will be noted that each bank of control buttons is spaced in a circle which has been divided into eleven segments; and that ten such buttons are associated with the first control bank and the five-wide stamp roll 38 while nine such buttons are associated with the second control bank and the single width stamp roll 39. At the center of this circle, and on the inner surface of the panel 33 is situated an integral boss 83 which supports a positioning pin 84 on which is situated a concentric count-down wheel 85. An elongated hub 86 thereof is in rotatable, contacting relationship with the boss 83. The outer periphery of this count-down wheel 85 includes a bevel ring gear 87.

An area of the control panel 33 surrounded by control buttons 79 associated with the first bank of controls will preferably have a dollar-sign inscribed thereon, and each of said buttons will be adjacent to control panel indicia running from 1 through 10. An area of the control panel surrounded by the control buttons associated with the second bank of controls will have a symbol representing "cents" inscribed thereon, and each of said buttons will be adjacent to indicia running in units of ten from 10 through 90.

A counter drum 88 associated with the five-wide stamp roll and with the first control bank and a counter drum 89 associated with the single width roll and the second control bank are both supported on a counter drum supporting shaft 90. This shaft is supported with respect to the side plates 35, 35. The counter drum 88 includes a cylindrical drum-like surface 91 which is of approximately the same longitudinal dimension as the width of the five-wide stamp roll. This drum has four longitudinally extending banks 92 of pins extending outwardly therefrom at 90° intervals. As shown, these pins are situated to be in alignment with the perforations separating the middle file of stamps as they pass over the roll. The circumferential distance between adjacent sets of pins will be equal to the dimension of the individual stamp in direction longitudinally of the strip. In other words, these banks of pins will coincide with and extend through each set of transverse stamp perforations when the stamps are in contact with the roll.

This counter drum 88 also includes an integral gear or pinion 93 which is in meshing relationship with a gear train including gears 94, 95 and 96, the last of which is in meshing operative relationship with the ring gear 87, thus positively relating the movement of the count-down wheel 85 and the counter drum 88.

In the case of the counter drum 89, the cylindrical surface to be coincident with the single width stamp roll is designated 97, and four longitudinally extending banks 98 of pins extend outwardly from said surface 97 at 90° intervals. The stamps of the single width roll will also fit exactly over the counter drum 89 so that the pins 98 extend through successive lines of perforations. A gear 99 is integral with the counter drum 89 and meshes with an idler gear 100 which in turn meshes with a gear 101, itself in meshing relationship with the ring gear 87 of the second control bank.

The counter drum 88 has associated with it a counter drum hub 103 extending longitudinally outwardly therefrom in adjacent spaced relationship to a first of the side plates 35 of the case 31. This hub 103 has two counter drum limiting dogs 104 extending outwardly therefrom each presenting a stop surface 105 in radial alignment with the axis of the drum supporting shaft 90, said surfaces 105 lying in a common plane.

Similarly, the counter drum 89 has a counter drum hub 106 extending longitudinally outwardly therefrom to be adjacent a second of the side plate 35, and this hub has four counter drum limiting dogs 107 extending radially outwardly therefrom. Each such dog is provided with a plane stop surface 108 extending radially outwardly from the axis of drum supporting shaft 90, each pair of surfaces 108 lying in a common plane, and said planes being mutually perpendicular to each other.

As is perhaps best seen in FIG. 4, guide ways 109 and 110 between the stamp rolls 38 and 39 and the counter drums 88 and 89 are provided for guiding the stamp strips 67 during loading of the machine and also during operation thereof. A guide shelf 111 is integral with and extends inwardly from a front wall of the operating panel 33 to serve as a guide for the stamps after they leave the stamp strip drive shaft 47 and idler rollers 69. A tear plate 112 extends forwardly of said front wall of the panel 33 and has a tearing edge 113 extending transversely of the stamp strip 67 to be positioned precisely in alignment with the perforations separating the individual stamps of said strip.

This tear plate tearing edge 113 serves, of course, as a severing edge member against which the perforated edge between the dispensed stamps and the stamps still within the machine can be pulled to separate the dispensed stamps from the roll. This tearing edge also serves as an index pointer to indicate the lineal limit of the stamps dispensed, thus to allow the machine operator or customer to check the number of stamps dispensed before the stamps are severed from the roll or before the machine is activated to dispense more stamps.

Each of the counter drum hubs 103 and 106 and the associated limiting dogs 104 and 107 are in operational alignment with a separate stop arm 114 which is pivotally mounted with respect to one of the side plates 35 as at 115. A separate counter drum stop solenoid 116 is also mounted on each of the side plates 35 and is operably associated with one of the stop arms 114 so that when said stop solenoid is energized, it moves the stop arm into clearing relationship with respect to the plane stop surface of the limiting dogs. A coil spring 117 is situated between each stop solenoid 116 and the stop arm 114 to normally cause the stop arm to be positioned in contacting, stopping relationship to said stop surface of the limiting dog.

The precise positioning of the stop arm 114 to be exactly in line with the outermost end of the limiting dog is accomplished by provision of a positioning boss 118 integral with and extending outwardly from one of the side plates 35. An end of the stop arm 114 spaced from the counter drum limiting dogs is operationally aligned with a motor control microswitch 119 which is mounted with respect to the side plate 35. The arrangement of the parts will be such that when the counter drum stop solenoid 116 is energized and, consequently, the stop arm 114 is in clearing relationship to the limiting dogs associated with the counter drum, the motor control microswitch will be in its closed or "motor on" condition. Conversely, when the stop solenoid 116 is de-energized and the spring 117 has moved the stop arm 114 to be in aligned, stopping relationship to the limiting dogs, the motor control microswitch 119 will be in its open or "motor off" condition.

The relationship of the limiting dogs and their plane stop surfaces, the diameter of the counter drums and the angular positioning of the longitudinally extending banks 92 and 98 of pins thereon, the stop arm 114 and the tearing edge 113 of the tear plate 112 is such that when the stop surface of the limiting dog is in contact with the end of the stop arm 114, a row of perforations in the stamp strip 67 will be exactly in alignment with said tearing edge.

As previously stated, there is an exact and predetermined relationship between the angular positioning of the count-down wheel 85 with respect to the associated control buttons and the resilient control columns on the one hand and the positioning of the stop surfaces of the limiting dogs and the end of the stop arm 114 on the other. When a limiting dog and the end of the stop arm 114 are in contacting relationship, each of the resilient control columns 82 will be in concentric alignment with one of eleven latch pins 120 which are slidably mounted with respect to the count-down wheel.

Each of these latch pins 120 has a control column receiving head 121 at a first end thereof, a latch retaining head 122 at a second end thereof, a reduced latch clearing portion 123 and a further reduced latching neck 124. A spring 125 between the count-down wheel 85 and the column receiving head 121 tends to move the latching pin in direction towards said resilient column 82.

Each of these latch pins 120 is associated with a latch 126 which is pivotally mounted with respect to its count-down wheel on a side thereof opposite said resilient column, and each such latch includes a latch pin receiving slot 127 which is provided with a latching shoulder 128 situated to be capable of being positioned in the latching portion 124 to prevent further movement of the latch pin 120. Each such latch 126 is biased as at 129 for pivotal movement in direction to permit said shoulder 128 to move into said reduced latching neck 124. An outer edge 130 of each latch 126 is provided with a camming surface 131, and a camming pin 132 is fixedly mounted to a positioning plate 133 which in turn is mounted on posts 134 with respect to the operating panel 33. The positioning of this cam 132 is such that it will contact the camming surface 131 on the outer edge 130 of every latch 126 to rotate said latch against said biasing force to cause the latching shoulder 128 to move into clearing relationship to the reduced latching neck 124. This allows the spring 125 to carry the latch pin 120 to position as seen in FIG. 10, for example, and allows the latch retaining head 122 to bear on a first outer surface 135 of said latch 126.

A pair of solenoid control microswitches 136 and 137 constitute elements of the first and second banks of controls, respectively. They are each pivotally mounted as at 138 to said positioning plate 133 and each has an operating trigger 139 extending therefrom in concentric relationship to the axis of the count-down wheel 85. A separate adjustable stop member 140 is situated at each end of a yoke 141 which is slidably mounted with respect to a stud 142 integral with the positioning plate 133. A spring 143 tends to maintain the yoke 141 in contacting relationship to said plate 133.

A solenoid operating plunger 144 includes a plunger pin 145 which is slidably mounted in a plunger pin opening 146 in the count-down wheel positioning pin 84. This plunger 144 also includes a shank portion 147 which is provided with a control dish contacting shoulder 148, and an outwardly extending microswitch contacting cup 149. Said cup 149 is provided with a switch contacting rim 150 and a trigger contacting bottom surface 151.

A circular control dish 152 is in concentric surrounding relationship to the solenoid microswitch control plunger 144. The plunger pin 145 extends through an opening in the center of said dish, a conical section extends outwardly from said center and a radially outwardly extending flange 153 of said dish is integral with said conical section and is in overlying relationship to all of the latch retaining heads 122 of the latch pins 120.

The positioning of the parts is such that when any one of the control buttons 79 is depressed to cause the corresponding resilient control column 82 to depress the latch pin 120 presently aligned therewith sufficiently so that the associated latch 126 is free to rotate to allow the latching shoulder 128 to move into the reduced latching neck 124, the latch retaining head 122 will move the control dish 152 sufficiently to force the plunger 144 in direction toward the microswitch sufficiently to cause the trigger 139 to activate such switch.

Figure 8:
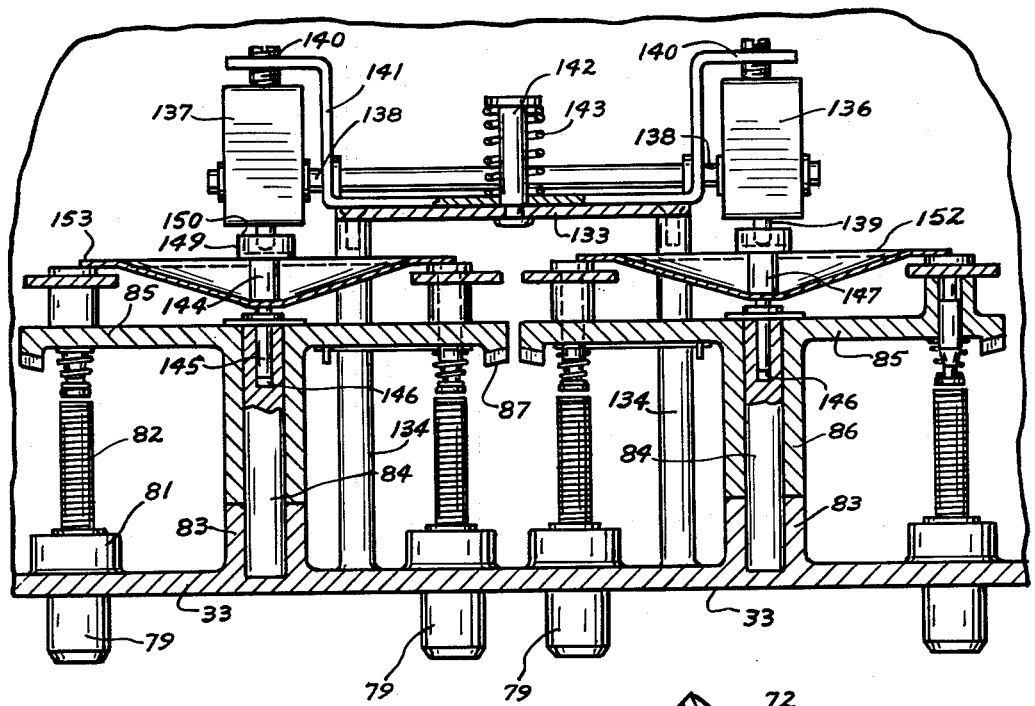
FIG. 8 is an enlarged sectional view taken on the line 8—8 in FIG. 5.

In the event that two or more of the control buttons 79 of a particular control bank are depressed at the same time, however, a corresponding number of latch pins 120 will be moved into latching relationship with their associated latches, and more movement will be accorded to the plunger 144 than is necessary to operate the microswitch 136 or 137 as the case may be. The stop member 140, the yoke 141 and the resilient support for that yoke with respect to the plate 133 are provided to prevent damage to the parts when this occurs. As best seen in FIG. 8, excessive motion of the plunger 144 in direction toward the microswitch 137, for example, will cause the rim 150 of the cup 149 to come into contacting relationship to the body of the microswitch, thus preventing excessive and damaging movement of the trigger 139. Substantially this condition will occur every time the control mechanisms are operated normally with one button depressed. Subsequent movement of the plunger in direction toward the microswitch, as will happen than when more than one button is depressed, will cause the entire microswitch, stop member 140 and yoke 141 to be displaced against the action of spring 143. This movement will prevent damage to any of the parts. The positioning of the microswitch when this occurs is illustrated in dotted lines in FIG. 10.

This yoke 141, the stud 142 and spring 143, it will be understood, take care of relieving the pressures which might otherwise be caused by excessive movement in either or both of the control banks. It is to be understood, however, that were the machine of the present invention designed to hold only one stamp roll, and have only one bank of controls, a similar resilient relief means could be provided to relieve the pressure on the single solenoid control microswitch.

The solenoid control microswitches 136 and 137 are each wired in separate closed loops with one of the counter drum stop solenoids 116 and any suitable source of electrical energy, here shown as battery 154. The motor control microswitches 119 are wired in parallel with each other and in series with a "hot" lead 155 from a source of electrical power (not shown) to the stamp strip drive motor 56. Another line 156 also extends from said source of electrical energy to said motor 56.

*Operation*

Typically, when a transaction is completed at the check-out counter of a super-market, it is desirable or necessary to dispense to the customer one trading stamp for each ten cents of his total purchase. To do this with a device made according to the present invention, the operator will depress the control button of the first bank associated with the indicia indicating the full dollar value of the purchase. If this dollar value is in excess of Ten Dollars ($10.00), the operator will depress the Ten Dollar ($10.00) button, will wait until 100 stamps are dispensed in a manner now to be described, and then will press the button indicating the difference between the total dollar value of the purchase and Ten Dollars ($10.00). The operator will then next depress the button associated with the indicia indicating the largest number of cents, divisible by ten, which may be divided into the remainder.

As an example, it will be assumed that the customer has just paid the super-market check-out person Seven Dollars and Seventy-seven Cents ($7.77) and that stamps representing the value of this purchase are now to be dispensed. The operator will depress the control button associated with the number seven on the first bank of controls, and will depress the control button associated with the number seventy on the second bank of controls.

The operation of the machine will first be considered as when the first bank button "seven" is depressed and the cycle allowed to come to a halt before the second bank button "70" is depressed.

The control button 79 will cause the resilient control column 82 to depress the latch pin 120 to move to position approximately as seen at the bottom of FIG. 10 and as seen in FIG. 14. The latch 126 will, under the action of the resilient biasing means 129, immediately move to position as seen in these figures. If the button is then instantaneously released, the latching shoulder 128 in the reduced latching neck 124 will prevent the latch pin 120 from returning to its normal position. Whether or not the button is released, the latch retaining head 122 will cause the control dish 152 to cause the plunger 144 to depress the trigger 139 to direct the energy from the battery 154, for example, to the solenoid 116. This solenoid will then become energized, pulling the stop arm 114 to position as seen in FIG. 15, thus clearing the counter drum limiting dog 104, and also closing microswitch 119 to energize the motor 56.

At the time the motor becomes thus energized, the clutch mechanism 57 is as pictured in FIG. 16, and the drive pulley 54 is at rest with respect to the body of the machine, even though the motor shaft 55 is beginning to rotate. As the speed of rotation of the motor and the shaft 55 increases, the centrifugal weights 62, 62 will move outwardly against the action of the spring 66 to cause the thrust links 65 to cause the slidable clutch plate 61 to move in direction toward the fixed clutch plate 58, both of which are rotating with the shaft 55. The construction and arrangement of the various parts is such that when the weights 62 have moved out to position as seen in FIG. 18, sufficient power will be available from the motor 56 at the motor shaft 55 to properly drive the mechanism including the stamp strip drive shaft, and at this point the clutch controlled drive pulley 54 will be effectively keyed to the motor shaft 55. This will, of course, cause the drive belt 53 to rotate the driven pulley 52 keyed to the stamp strip drive shaft 47, thus to rotate the drive shaft and in this manner to cause the stamp strip 67 from the five-wide stamp roll to begin movement through the machine. This movement of the stamp strip through the machine will, because of the positioning of the banks 92 of pins on the counter drum 88 through the center file of stamps, cause the counter drum to be rotated; and, because of the gear train including gears 94, 95 and 96 and the ring gear 87, will cause rotation of the count-down wheel 85. As this wheel rotates, the latches 126 will move in succession past the camming pin 132. As previously explained, each of these latches will be depressed slightly by contact with the camming pin 132. The seventh latch, however, resting in the reduced latching neck 124 of the latch pin 120, extends farther out toward said camming pin. The camming surface 131 of the latch 126 will contact this pin 132 and will be depressed to release the latch pin 120 well before the counter drum and the counter drum limiting dogs reach the position as set out in FIG. 15, for example. As this latch pin 120 drops, the control dish 152 will drop, under the resilient action of the spring loaded trigger 139 from position as seen in FIG. 11 to position as seen in FIG. 10. This will result in a breaking of the circuit to the solenoid 116 inside of the microswitch 136, and the spring 117 between the solenoid 116 and the stop arm 114 will force the stop arm to position similar to that seen in FIG. 4. With the movement of the arm 114 to that position, the motor circuit through motor control microswitch 119 will be broken; the momentum of the parts will be such that the counter drum, gear train, count-down wheel and stamp roll itself will continue to move. This momentum will carry the counter drum limiting dog toward and into interfering contact with the stop arm 114 to stop all parts and thus to precisely position the roll of perforations in tearing alignment with the tearing edge 113 of the tear plate 112.

The gearing referred to above in connection with the first control bank is such that as any particular latching pin moves from alignment with one resilient column 82 to alignment with the next resilient column 82, a total of two stamps has passed under the tearing edge 113. Thus it will be seen that a five-wide stamp strip will dispense stamps in units of ten. In a typical case, this will represent a one dollar ($1.00) purchase by the customer to whom the stamps are being dispensed. In other words, in the particular case under consideration, the parts will come to rest with exactly seventy stamps extending beyond the tearing edge 113.

When the operator now depresses the control button associated with the numeral 70 in the second control bank, the action which takes place will be exactly parallel to the action which has just been described, with the exception of the fact that the gearing between the counter drum 89 and the count-down wheel 85 is such that only one stamp passes the tearing edge 113 as any particular pin moves from alignment with one resilient column to alignment with the next adjacent column. In other words, depressing the seventh control button (associated with the number "70") will result in the dispensing of seven stamps past the tearing edge 113.

These seventy-seven stamps will now be severed from the stamp strips by tearing them along the tearing edge 113.

Figure 12:
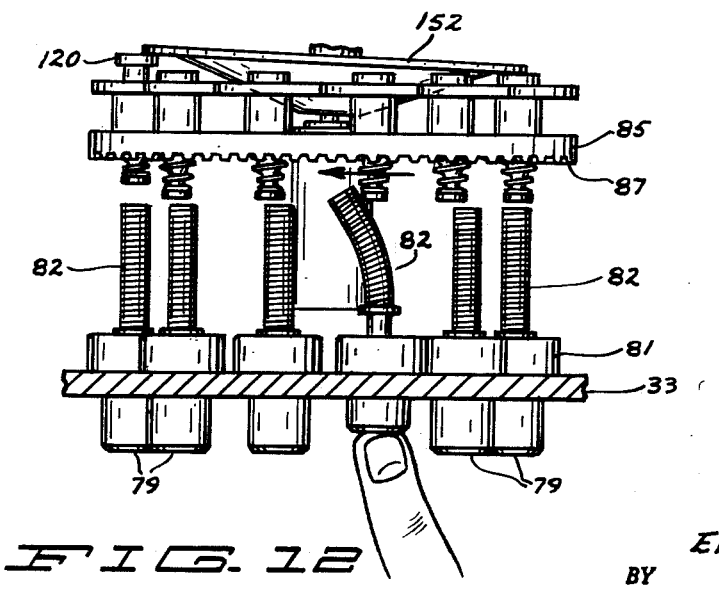
FIG. 12 is a fragmentary sectional view of part of the opening panel cover, and one bank of the control buttons, resilient control columns, and latch pins and a count-down wheel substantially as they would appear from in front of the parts as they are seen in FIG. 8.

Inasmuch as the machines made according to this first form of the present invention will have very hard and continuous use by personnel not skilled in operating mechanical devices, it is necessary to take into account all possible conditions which might damage the mechanism. For example, this is why the columns 82 are made up of spring coils constituting a flexible structure. In operating the machine, there is no assurance that the operator will immediately withdraw the finger from the control button after it has been depressed. Accordingly, as best seen in FIG. 12, as the count-down wheel 85 rotates in the direction indicated by the arrow because of the fact that the latch pin 120 shown now to have moved farthest to the left in FIG. 12 is in the latched position, subsequent latch pins will strike the end of the depressed column as they pass it. In the figure as shown, the third latch pin is in the process of striking the resilient column and deflecting it to the side. Obviously no damage will be done, and as soon as the operator does remove the finger from the control button, the column will resume its position and will be usable to again cause the machine to dispense stamps when needed.

The operation of the machine will now be considered as when buttons on both banks are depressed in rapid succession.

It is to be expected that the particular control button selected in the first bank of controls and the control button selected in the second bank may be depressed in rapid succession or even simultaneously. In this event, both the microswitch 136 and the microswitch 137 will be closed to energize both of the solenoids 116. Whichever solenoid closes first will close the microswitch 119 associated therewith and will cause the motor to go into operation. As is always the case whether one or two buttons are depressed, the stamp strip drive shaft 47 will begin to rotate as soon as the clutching mechanism causes it to do so. If both solenoids are energized at this point, both arms 114 will be clear of the limiting dogs, each stamp strip will begin to be driven between the drive shaft and the idler rollers, and both counter drums will begin to rotate. Just before the proper number of stamps has been dispensed from one of these strips or the other, the latch associated therewith will release to allow the latch pin 120 to permit the corresponding control dish 152 and the plunger 144 to cause the motor circuit through the associated motor control microswitch to be broken. The stop arm 114 will bring the counting drum to a halt when precisely the right number of stamps has been dispensed, but the motor will continue to turn the drive shaft unless and until the other bank of controls is similarly de-energized.

Thus it will be seen that latching of any one of the latch pins will indirectly cause the motor to be energized and the stamp strip drive shaft to be rotated, but the strip associated with a particular stop arm 114 can be driven only when that stop arm moves into clearing relationship to the counter drum limiting dog associated therewith. In this way, an entirely accurate and precise drive is economically obtained with the use of only one driving mechanism and one motor and with a minimum of switches and solenoids.

Another possible cause of difficulty arises from the fact that as many latch pins 120 will move to latched position as there are buttons depressed at a particular time. Thus, as previously explained, the travel limit of the microswitch trigger 139 can be exceeded and, unless provisions are made to take care of this, damage could result to the parts. As previously explained, this eventuality is taken care of by the provision of the stop members 140 being resiliently positioned with respect to the microswitch positioning plate 133.

Referring now to FIGS. 20 and 21 and to a second form of the drive mechanism shown therein, parts identical with the embodiment of the invention illustrated in FIGS. 1 through 19 are identically numbered.

In this second form of the invention, the push button controls, and the electrical circuitry for energizing the main drive motor are exactly the same as they are in the first form of the invention.

A stamp dispensing machine 175 includes an outer case 176 on which an operating panel 177 is mounted. The operating panel 177 corresponds to the panel 33 in the first form of the invention. The panel can be removed to permit stamps to be threaded through the machine. A transverse counting drum supporting shaft 178 is rotatably mounted at opposite ends thereof in provided journals on brackets mounted to the stamp dispensing machine outer case 176.

A counter drum 179 is associated with a five-wide stamp roll, as in the first form of the invention and with a first control bank identical to the first control bank in the first form of the invention. A counter drum 180, which is associated with the single width roll of stamps, is operated by a second control bank identical to the second control bank of the first form of the invention. Both the counter drum 179 and the counter drum 180 are supported on the counter drum supporting shaft 178.

The counter drum 179 has a cylindrical drum-like surface 181, which is approximately the same longitudinal dimension as the width of a five-wide stamp strip 184. The drum has four longitudinally extending banks of pins 182 extending radially outwardly therefrom at substantially 90° intervals. The pins are situated to be in alignment with the perforations separating individual stamps forming the middle strip of stamps in the five-wide roll as this strip passes over the counter roller and extend through perforations between each transverse set of stamps.

Figure 7:
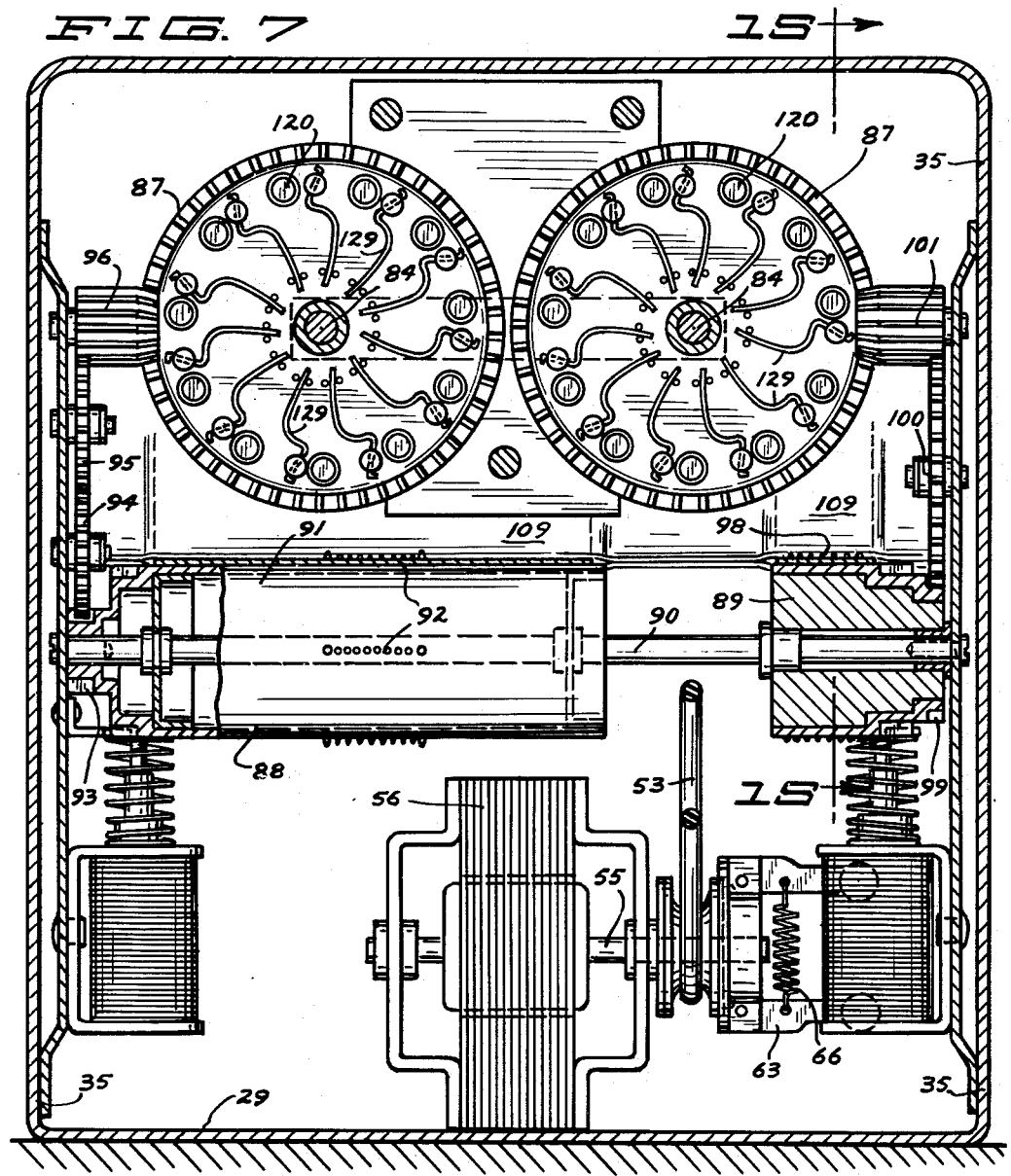
FIG. 7 is an enlarged sectional view taken on the line 7—7 in FIG. 4.
Figure 19:
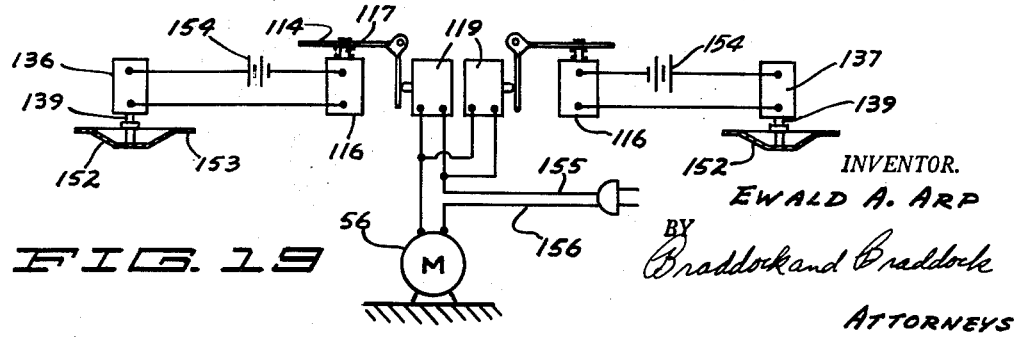
FIG. 19 is a schematic representation of an electrical circuit of the present invention.

The counter drum 179 has an integral gear 183 which is in driving relationship with a gear train which corresponds to gears 94, 95 and 96 of the first form of the invention. The gear 183 meshes with the gear 94. The gear 96 meshes with pinion 87 to operate the first control bank as shown in FIG. 7. The counter drum 180 has a cylindrical surface 186 which is substantially the same width as a single width stamp strip 223. The drum 180 is provided with a plurality of longitudinally extending banks 187 of pins which extend radially outwardly from the surface of the counter drum 180 and are spaced at 90° intervals to fit into the perforations between adjacent stamps.

A gear 188 is integral with the counter drum 180 and meshes with a gear 100, which in turn meshes with a gear 101 that is drivingly engaged with a ring gear 87 of the second control bank, as explained in connection with the first form of the invention.

The counter drum 179 has associated with it a counter drum hub 189 extending longitudinally therefrom in adjacent spaced relationship to a first of a pair of side plates of the case 176. The hub 189 has two counter drum limiting dogs 190 extending outwardly therefrom and each dog has a stop surface 191 in radial alignment with the axis of drum supporting shaft 178. The surfaces 191 lie in a common plane.

The counter drum 180 has a counter drum hub 192 integral therewith and extending longitudinally outwardly therefrom. The hub 192 has four counter drum limiting dogs 193 extending radially outwardly therefrom. Each of the dogs 193 is provided with a stop surface 196 extending radially outwardly from the axis of drum supporting shaft 178.

The structure of the counter drums just described corresponds substantially to the structure of the counter drums in the first form of the invention.

A motor 197, which corresponds to the drive motor 56, is mounted in the case 176 and has an output shaft 198, which extends transversely across the case for the stamp dispensing machine. Shaft 198 is elongated as shown and if desired the outer end of the shaft may be supported to prevent excessive deflection.

A pivot shaft 199 is rotatably mounted in a bearing 200 on one of the motor brackets 201 at a first end thereof and as at 202 at a second end thereof.

A pair of pivot arms 203, 203 are mounted onto the pivot shaft 199 and extend forwardly therefrom toward the front panel of the outer case 176. A jack shaft 206 is rotatably mounted at its outer ends to the outer ends of the pivot arms 203. The axis of jack shaft 206 is substantially parallel to the axes of pivot shaft 199 and motor shaft 198.

A drive pulley or sheave 207 is drivably mounted onto the outer end of motor shaft 198 and a driven V-belt sheave 208 is drivably mounted onto the jack shaft 206 and is positioned substantially midway between the pivot arms 203, 203. A V-belt 209 is drivably mounted over the sheave 207 and the sheave 208. Thus when the motor is running, the shaft 206 is rotated through the sheaves 207 and 208 and belt 209.

A first flat belt pulley 210 and a second flat belt 211 are drivably mounted onto the jack shaft 206 and are positioned on opposite sides of driven sheave 208. The first pulley 210 aligns with a flat belt pulley 212, which is integral with counter roller 179 and which is positioned on an opposite end thereof from the hub 189. The second flat belt pulley 211 on jack shaft 206 aligns with a flat belt pulley 213, which in turn is integral with counter drum 180 and is positioned on the opposite end of the drum from the counter drum hub 192. A first flat belt 214 is frictionally drivably mounted over the driving surface of first flat belt pulley 210 of jack shaft 206 and extends to frictionally drivably engage pulley 212 on counter drum 179. A second flat belt 215 is frictionally drivably mounted over second flat belt pulley 211 on shaft 206 and extends to engage flat belt pulley 213, which is integral with counter drum 180.

A pair of springs 220, 220 are mounted to separate provided brackets 221, 221, which are integral with the case 176 and each of the springs 220 extends upwardly and is mounted as at 222 to one of the pivot arms 203, and tend to tension the flat belts 214 and 215. This determines the amount of force which can be transmitted through the belts. Each of the flat belts and its associated pulley forms a part of a slippage linkage in the drive train to its associated stamp strip.

Each of the counter drum hubs 189 and 192, respectively, and the associated limiting dogs 190 and 193 are in operational alignment with a separate stop arm 114 which is mounted with respect to the side plates of the case, as in the first form of the invention. A separate counter drum stop solenoid 116 is also mounted to each of the side plates, as previously described. Each of the stop solenoids is operably associated with one of the stop arms 114 so that when one of the stop solenoids is energized it moves its associated stop arm with respect to the plane stop surface of the aligned limiting dog. A coil spring 117 is situated between stop solenoid 116 and the stop arm 114 to normally cause the stop arm to be positioned so as to intercept the stop surface on one of the limiting dogs of its associated counter drum hub and thereby prevent the counter drum from rotating past the stop position.

In this form of the invention a strip of stamps, whether it is one stamp wide or five stamps wide, is threaded from a storage roller mounted as in the first form of the invention and as previously described, and extends upwardly over the associated counter drum for that strip of stamps. For example, the single width stamp strip 223 will be mounted over counter drum 180 and the five stamp wide strip 184 will be mounted over counter drum 179.

The stamps extend between the surfaces 181 and 186, respectively and provided guide members 224, which are integral with the operating panel 177 of the stamp dispensing machine and align with the counter drums. The guide members 224 have surfaces spaced closely from surfaces 181 and 186 respectively, and hold the stamp strips against the aligned surfaces of the counter drums. Also, the guide members 224 are provided with slots 225 which align with the pins 182 and 187 respectively on the counter drums. The upper portion or tips of the pins extend through the provided perforations in the strip of stamps with which they are associated and pass through the slots 225. Thus, the stamps are held positively on the counter drums and will not jump off the pins. The strips of stamps then pass between the pair of forward guides 226 and 227, and through a provided opening 228 at the front of the stamp dispensing machine. A tear plate 112, which has a tearing edge 113 is provided at the front of stamp dispensing machine, as in the first form of the invention. The tear plate and tearing edge permit the operator to tear the dispensed stamps precisely along perforations between adjacent stamps. The arm 114 of each of the solenoids halts the stop surfaces on the limiting dogs of the counter drums in position to insure that the dispensed stamps will be properly aligned with respect to the tearing edge before they are torn from their strip.

In this second form of the invention, it will be seen that the strips of stamps are driven by the counter drums. The slippage linkage or friction drive for the strip of stamps is still utilized to prevent tearing of the strip, but in a different manner. The drive means from the motor goes through a friction drive to the counter drums. The counter drum is the only mechanism pulling on the strip of stamps.

When the stamps are to be dispensed, as explained previously in regard to the controls of the mechanism, the proper control button is pushed, thereby initiating operation of the mechanism. The proper solenoid 116 is energized to move its associated arm 114 from engagement with the limiting dog of its associated counter drum. Motor 197 is then energized, thereby driving its output shaft 198 and, through sheaves 207 and 208 and belt 209, the jack shaft 206. The jack shaft 206 will rotate and drive both of the flat belt pulleys 210 and 211 mounted thereon, which in turn will attempt to rotate their respective counter drums. When one of the stop arms 114 is released so that one of the counter drums can rotate, the associated belt will drive that drum. For example, if the stop arm 114 for counter drum 180 was released, flat belt pulley 211 would drive belt 215 and this in turn would drive pulley 213 and rotate the counter drum 180 thereby moving the strip 223 from its storage roll and forcing it out through the opening 228.

The amount of force with which the counter drum 180 can be driven is controlled by regulating the tension of springs 220 acting on the pivot arm 203. Springs 220 are set so that the maximum torque which can be transmitted through the flat belts at their associated pulleys is less than that which would result in a tearing of the stamps. Therefore, the strip of stamps will start gradually under the sliding friction drive and there will be no tearing. The driving force of the belts will be sufficiently low so that the drive pins on the counter drums will not elongate the perforations or holes through which they extend.

When the proper number of stamps have been dispensed, as counted by the counter drums and gear train, the solenoid and motor will be shut off and arm 114 will again be urged by spring 117 to position wherein it will intercept the next limiting dog 193 of counter drum 180. This will stop the counter drum when the proper number of stamps has passed the tearing edge 113.

As in the first form of the invention, if the solenoid 116 for the stamp counter drum 179 is not energized, its associated arm 114 will continue to engage the limiting dog 190 for this drum. The belt 214 will then merely slip with respect to pulleys 210 and 212 and will not drive the drum. The stamp strip associated with drum 179 will, therefore, not move.

The concept of utilizing a slippage linkage which will transmit only a small amount of power thus to prevent tearing of the stamps may be accomplished in other ways. For example, the flat belt-pulley linkages could be replaced with positively geared drive from the jack shaft 206 and the first gears of such drives could be slippingly frictionally mounted on said jack shaft. In all these cases, the presence of a slippage linkage in the drive train to one of the stamp strips makes it possible for that strip to be held still during drive of the other strip by the single drive motor.

FIG. 22 shows a third form of drive which also embodies the slippage linkage concept. In FIG. 22, a counter drum 235 is used and is mounted onto a counter drum support shaft 236 as in the previous forms of the invention. The counter drum 235 has limiting dogs 237 and stop surfaces 238 which cooperate with an arm 114 and solenoid 116 as previously explained in connection with other forms of the invention. The counter drum support shaft 236 is rotatably mounted in an outer case 239 of a stamp dispensing machine 240. Upper cover 241 is utilized as in the previous forms of the invention. The stamp counter drum 235 has an integral gear 242 on one end thereof which drives gear 100 and thus is drivably connected to the controls as in the other forms of the invention.

In order to obtain slippage linkage drive in this form of the invention, a cross shaft 243 is rotatably mounted in pivot arms 248 which are pivotally supported between the side walls of the case 239. The cross shaft 243 has a friction drive roller section 244 drivably mounted thereon and aligning with each of the strips of stamps to be dispensed. A spring 249 urges pivot arms 248 toward the counter drum 235.

As shown, there are two separate strips of stamps which are being dispensed, one a single width strip and one a five stamp wide strip. The friction roller sections 244 bear directly upon such a strip 245 of stamps which is in turn mounted over an outer surface 246 of the counter drum 235. The counter drum 235 has pins 247 as previously used and the pins extend through the perforations transverse to the strip of stamps. Roller sections 244 are slotted to permit passage of said pins.

A pulley 250 is drivably mounted onto shaft 243 and a V-belt 251 is mounted onto the pulley 250. The belt 251 extends downwardly and is drivably mounted over a drive pulley 253 which in turn is mounted onto a shaft extending from a motor 255. A suitable spring loaded belt tightener 254 is utilized for maintaining the belt 251 under sufficient tension to effect a driving relationship between pulley 255 and pulley 250, and to regulate the force that can be transmitted by the motor to shaft 243.

When the stamp dispenser is energized to dispense the strip 245, the stop arm 114 will move away from the counter drum limiting dogs and permit the counter drum to rotate.

The motor 255 will be energized and will drive the pulley 250 which in turn will drive shaft 243 through belt 251. The friction roller section 244 will in turn frictionally engage the unglued surface of the strip of stamps 245, which is being dispensed, and force the strip and the counter drum to move. The strip is moved between a guide 256 and a support shelf 257 and out through an opening 258 in the front of the case. The stamps dispensed can be torn against a cutting edge 113 of a tear blade 112.

In the form of the invention shown in FIG. 22, a friction drive of stamps is accomplished through the friction section 244, and the stamp strip. The force transmitted is sufficiently low to preclude tearing of the stamps when they are dispensed from the storage roll.

In this form of the invention the centrifugal clutch on the motor shaft can be utilized if desired.

When two strips are controlled, the counter drum for the second strip will not be released. The friction roller section 244 will merely slip on the retained strip of stamps until the other strip has been dispensed and the motor is stopped. Thus simultaneous or individual dispensing of the stamps can be effected.

What is claimed is:

1. A machine for dispensing stamps from an elongated transversely perforated strip of stamps wound into a roll; said machine including a main frame; roll supporting means mounted with respect to said main frame; a strip drive shaft rotatably mounted with respect to said main frame; a strip drive shaft motor; motor energizing means; drive means responsive to the speed of said motor for drivably connecting said motor to said strip drive shaft after said motor has reached an effective driving speed; first means to prevent feed of said elongated strip; second means to disable said first means; manually operable means for preselecting the number of stamps to be dispensed from said machine; said manually operable means, motor energizing and said second means being operable at substantially the same time to cause said strip to move through said machine; and third means operable to stop said stamp strip precisely when all of the last stamp of said preselected number of stamps has moved through the machine.

2. A machine for dispensing linear units from an elongated perforated strip extending from a roll of such units, said machine including a main frame; roll supporting means mounted with respect to said main frame; a strip drive shaft rotatably mounted with respect to said main frame; a strip drive shaft motor; motor energizing means; drive means operably connecting said motor to said strip drive shaft; a counter drum rotatably mounted on said frame, said counter drum including banks of pins extending radially outwardly from the outer periphery thereof in position to aline with and pass through said perforations in said elongated strip when said elongated strip lies in contact with said outer periphery of said drum; guideways providing a path for said elongated strip at right angles to the axis of said drum and said shaft, circumferentially around the peripheral portions of said drum and said shaft and to a position outside of said machine; latch means to prevent rotation of said counter drum and thereby to prevent feed of said elongated strip; latch disabling means to release said latch means; an idler roller rotatably mounted with respect to said frame in position to be in bearing relationship to a portion of said elongated strip where in contact with said strip drive shaft; biasing means urging said idler roller toward said strip drive shaft with enough force to permit sufficient friction to develop between said strip and said strip drive shaft to cause said strip to be pulled from said roll and to drive said counter drum when said latch means is disabled, but without force sufficient to tear said strip at any time when the peripheral surface of said strip drive shaft is moving over the surface of said strip at a speed greater than the lineal speed of the strip; manually operable means for preselecting the number of said linear units to be dispensed by said machine; said manually operable means, said motor energizing means and said latch disabling means being operable at the same time to cause said strip to move htrough said machine; and release means operable when no more than a portion of the last one of said preselected number of linear units passes through said machine to incapacitate said latch disabling means to the end that said latch means will interrupt movement of said counter drum and said strip precisely when all of the last unit of said preselected number of linear units has moved through the machine.

3. A machine for dispensing linear units from an elongated perforated strip extending from a roll of such units, said machine including a main frame; roll supporting means mounted with respect to said main frame; a strip drive shaft rotatably mounted with respect to said main frame; a strip drive shaft motor; motor energizing means; drive means responsive to the speed of said motor for drivably connecting said motor to said strip drive shaft after said motor has reached an effective driving speed; a counter drum rotatably mounted on said frame, said counter drum including banks of pins extending radially outwardly from the outer periphery thereof in position to aline with and pass through said perforations in said elongated strip when said elongated strip lies in contact with said outer periphery of said drum; guideways providing a path for said elongated strip at right angles to the axis of said drum and said shaft, circumferentially around the peripheral portions of said drum and said shaft and to a position outside of said machine; latch means to prevent rotation of said counter drum and thereby to prevent feed of said elongated strip; latch disabling means to release said latch means; an idler roller rotatably mounted with respect to said frame in position to be in bearing relationship to a portion of said elongated strip where in contact with said strip drive shaft; biasing means urging said idler roller toward said strip drive shaft with enough force to permit sufficient friction to develop between said strip and said strip drive shaft to cause said strip to be pulled from said roll and to drive said counter drum when said latch means is disabled, but without force sufficient to tear said strip at any time when the peripheral surface of said strip drive shaft is moving over the surface of said strip at a speed greater than the lineal speed of the strip; manually operable means for preselecting the number of said linear units to be dispensed by said machine; said manually operable means, said motor energizing means and said latch disabling means being operable at the same time to cause said strip to move through said machine; and release means operable when no more than a portion of the last one of said preselected number of linear units passes through said machine to incapacitate said disabling means to the end that said latch means will interrupt movement of said counter drum and said strip precisely when all of the last unit of said preselected number of linear units has moved through the machine.

4. A machine for dispensing stamps from an elongated transversely perforated strip of stamps wound into a roll, said machine including a main frame; roll supporting means mounted with respect to said main frame; an index pointer fixedly positioned with respect to said main frame; a friction drive mechanism including a stamp friction drive shaft motor, a stamp friction drive shaft rotatably mounted with respect to said main frame in adjacent contacting relationship to a strip of stamps extending from said roll to a discharge position adjacent said pointer, drive means operably connecting said motor to said friction drive shaft, motor energizing means, an idler roller rotatably mounted with respect to said frame in position to bear on said stamp strip where in contact with said stamp friction drive shaft; biasing means urging said drive shaft and idler roller toward each other when said stamp strip is therebetween with sufficient force to normally cause said strip to be frictionally driven through the machine by said drive shaft but without sufficient force to tear said stamp strip when the stamp strip has less lineal speed than the peripheral speed of said friction drive shaft; a positive count-down mechanism including a cylindrical counter drum rotatably mounted on said frame and in contacting driven relationship to said stamp strip between said friction drive shaft and said roll, said counter drum including banks of pins extending radially outwardly from the outer periphery thereof in position to aline with and pass through said perforations in said elongated stamp strip when said strip lies in contact with the drum periphery to thereby preclude lineal movement of said strip without corresponding synchronized peripheral movement of said drum, manually operable means to preselect the number of stamps to be dispensed by said machine, a counter drum limiting dog rotatable with said counter drum, a stop arm selectively movable from a first normal position in movement preventing relationship to said dog to a second position in clearing relationship thereto, the relationship between the stamp strip and its perfortions, the counter drum pins, the counter drum, the counter drum dog, the stop arm and the index pointer being such that each time said stop arm is in a movement preventing relationship to said dog a line of perforations is aligned with said index pointer, latch means to normally position said stop arm in said first position, latch disabling means to position said stop arm in said second position, means responsive to said manual means and responsive to the rotation of said counter drum to incapacitate said latch disabling means when no more than a portion of the last one of said preselected number of stamps passes said index pointer thus to cause said stop arm to move to said first position in time to positively stop said dog, drum and stamp strip when the last line of perforations associated with the last stamp of said preselected number of stamps is exactly aligned with said index pointer.

5. A machine for dispensing stamps from at least two banks of separate elongated transversely perforated strips of stamps each wound into a separate roll, said machine including a main frame; roll supporting means mounted with respect to said main frame; at least one index pointer fixedly positioned with respect to said main frame; a single friction drive mechanism including a single stamp friction drive shaft motor, a single stamp friction drive shaft rotatably mounted with respect to said main frame in adjacent contacting relationship to each of said strips of stamps extending from each of said rolls to a discharge position adjacent said pointer, drive means operably connecting said motor to said friction drive shaft, motor energizing means, separate idler rollers each associated with one of said strips of stamps and each rotatably mounted with respect to said frame in position to bear on its associated stamp strip where that strip is in contact with said stamp friction drive shaft, biasing means urging each of said idler rollers toward said single drive shaft when its associated stamp strip is therebetween with sufficient force to normally cause said strip to be frictionally driven through the machine by said friction drive shaft but without sufficient force to tear said stamp strip when the stamp strip has less lineal speed than the peripheral speed of said drive shaft; a positive count-down mechanism for each bank of stamp strips including a separate counter drum for each bank rotatably mounted on said frame and in contacting driven relationship to its associated stamp strip between said friction drive and said stamp roll, each such counter drum including banks of pins extending radially outwardly from the outer periphery thereof in position to aline with and pass through said perforations in said elongated stamp strip when said strip lies in contact therewith to thereby preclude lineal movement of said strip without corresponding synchronized peripheral movement of said drum, manually operable means for preselecting the number of stamps to be dispensed from each of the stamp strips by said machine, a counter drum limiting dog for each counter drum rotatable with said counter drum, a stop arm for each counter drum limiting dog selectively movable from a first normal position in movement preventing relationship to said dog to a second position in clearing relationship thereto, the relationship between each stamp strip and its perforations, its associated counter drum pins, counter drum, counter drum dog, and the index pointer being such that each time said stop arm is in movement preventing relationship to said dog a line of transverse perforations is aligned with said index pointer, latch means associated with each counter drum to normally position said stop arm in said first position, latch disabling means associated with each drum to position said stop arm in said second position, means responsive to said manual means and responsive to rotation of said counter drum to incapacitate said latch disabling means when no more than a portion of the last one of said preselected number of stamps passes said index pointer thus to cause said stop arm to move to said first position in time to positively stop said dog, drum and stamp strip when the last line of perforations associated with the last stamp of said preselected number of stamps is exactly aligned with said index pointer.

6. The combination as specified in claim 5 wherein operation of any of the manually operable means to preselect the number of stamps to be dispensed from a particular stamp strip simultaneously institutes operation of said motor energizing means and the particular latch disabling means associated with that stamp strip, and wherein said motor energizing means remains operative until the last of said motor disabling means has been incapacitated.

7. A machine for dispensing stamps from an elongated transversely perforated strip of stamps wound into a roll, said machine including a main frame; roll supporting means mounted with respect to said main frame; a strip drive shaft rotatably mounted with respect to said main frame; a strip drive shaft motor; motor energizing means; drive means responsive to the speed of said motor for drivably connecting said motor to said strip drive shaft after said motor has reached an effective driving speed; latch means to prevent feed of said elongated strips; latch disabling means to disable said latch means; manually operable means for preselecting the number of stamps to be dispensed from said machine; said manually operable means, motor energizing means and said latch disabling means being operable at substantially the same time to cause said strip to move through said machine; and release means operable to stop said stamp strip precisely when all of the last stamp of said preselected number of stamps has moved through the machine.

8. A machine for dispensing linear units from an elongated transversely perforated strip extending from a roll of such units; said machine including a main frame; roll supporting means mounted with respect to said main frame; a strip drive motor; motor energizing means; strip drive means mounted between said motor and said strip to tend to move said strip through said machine whenever the motor is energized, said drive means including a slippage linkage having a plurality of frictionally drivably engaged elements movable with respect to each other; a counter drum rotatably mounted on said frame, said counter drum including banks of pins extending outwardly from the periphery thereof in position to aline with and pass through said perforations in said elongated strip when said elongated strip lies in contact with said outer periphery of said drum; guideways providing a path for said elongated strip at right angles to the axis of said drum, circumferentially around the peripheral portion of said drum and to a position outside of said machine; latch means to prevent rotation of said counter drum and thereby to prevent feed of said elongated strip; latch disabling means to release said latch means; means biasing said frictionally engaged elements to generate sufficient friction to cause said strip to be pulled through said machine; said elements being slippable with respect to each other when the force exerted by said motor tending to feed said strip exceeds the force tending to prevent feed of said strip; manually operable means for preselecting the number of linear units to be dispensed by said machine; said manually operable means, said motor energizing means and said latch disabling means being operable to cause said strip to move through said machine; and release means operable when no more than a portion of the last one of said preselected number of linear units passes through said machine to incapacitate said latch disabling means to the end that said latch means will interrupt movement of said counter drum and said strip precisely when all of the last unit of said preselected number of linear units has moved through the machine.

9. The combination as specified in claim 8 wherein said frictionally engaged elements are comprised as a first flat belt pulley driven by said motor and a flat belt drivably mounted on said pulley.

10. The combination as specified in claim 9; a jack shaft; wherein said first flat belt pulley is mounted on said jack shaft; a pair of pivot arms pivotally mounted at first ends thereof with respect to the main frame of said machine and rotatably mounting said jack shaft at second ends thereof; wherein said biasing means urges said jack shaft in direction to tend to tighten said flat belt; and means extending between said strip drive motor and said jack shaft to drive said jack shaft when said motor is energized.

11. The combination as specified in claim 10 wherein said counter drum has a second flat belt pulley integral with one end thereof and said flat belt extends between said first and second flat belt pulleys.

12. A machine for dispensing linear units from at least two banks of separate elongated transversely perforated strips of such units; said machine including a main frame; a single drive motor; motor energizing means; strip drive means mounted between said motor and said strips to tend to move said strips through said machine whenever the motor is energized, said drive means including a slippage linkage having a plurality of frictionally drivably engaged elements movable with respect to each other; a separate counter drum for each bank of strips rotatably mounted on said frame, each such counter drum including rows of pins extending outwardly from the periphery thereof in position to aline with and pass through said perforations in said elongated strip when said elongated strip lies in contact with said outer periphery of said drum; guideways providing a path for each of said elongated strips at right angles to the axis of its drum, circumferentially around the peripheral portion of said drum and to a position outside of said machine; separate latch means for each counter drum to prevent rotation of said counter drum and thereby to prevent feed of its elongated strip; latch disabling means for each counter drum to release said latch means; means biasing said frictionally engaged elements to generate sufficient friction to cause each strip to be pulled through said machine; said elements tending to drive a particular strip being slippable with respect to each other when the force exerted by said motor tending to feed said strip exceeds the force tending to prevent feed of said particular strip; manually operable means for preselecting the number of linear units to be dispensed from each of said strips by said machine; said manually operable means, said motor energizing means and a particular latch disabling means operable to cause a particular strip to move through said machine; and release means for each counter drum operable when no more than a portion of the last one of said preselected number of linear units of its strip passes through said machine to incapacitate its latch disabling means to the end that its latch means will interrupt movement of said counter drum and said strip precisely when all of the last unit of said preselected number of linear units has moved through the machine.

13. A machine for dispensing linear units from at least two banks of separate elongated transversely perforated strips of such units; said machine including a main frame; a single drive motor; motor energizing means; strip drive means responsive to the speed of said motor to be drivably mounted between said motor and said strips to tend to move all of said strips through said machine whenever the motor is energized and after it has reached an effective driving speed, said drive means including a slippage linkage having a plurality of frictionally drivably engaged elements movable with respect to each other and means biasing said frictionally engaged elements to generate a predetermined maximum torque toward the drive of each such strip; a separate first means for each of said strips to prevent feed of said elongated strip; a second separate means for each of said strips to disable a corresponding first means; manually operable means for preselecting the number of stamps to be dispensed from each of said strips by said machine; said manually operable means, motor energizing means and a particular one of said second means being operable to cause the strip associated with said second means to move through said machine; and third separate means for each of said strips operable to stop its associated strip precisely when all of the last linear unit of said preselected number of units has moved through said machine.

14. A machine for dispensing stamps from an elongated transversely perforated strip thereof; said machine including: a main frame; a drive motor; motor energizing means; strip drive means mounted between said motor and said strip to tend to move said stamp strip through said machine whenever the motor is energized, said strip drive means including a slippage linkage having a plurality of frictionally drivably engaged elements movable with respect to each other and means biasing said frictionally engaged elements to generate a predetermined maximum torque; said frictionally engaged elements including a first flat belt pulley driven by said motor and a flat belt drivably mounted on said pulley; first means to prevent feed of said elongated strip; second means to disable said first means; manually operable means for preselecting the number of stamps to be dispensed from said machine; said manually operable means, motor energizing means and said second means being operable to cause said strip to move through said machine; and third means operable to stop said stamp strip precisely when all of the last stamp of said preselected number of stamps has moved through the machine.

15. The combination as specified in claim 14; a jack shaft; wherein said first flat belt pulley is drivingly mounted on said jack shaft; a pair of pivot arms each pivotally mounted at a first end thereof with respect to the main frame of said machine and rotatably mounting said jack shaft at a second end thereof; said bias means urging said jack shaft in direction to tend to tighten said flat belt; and means extending between said strip drive motor and said jack shaft to drive said jack shaft when said motor is energized.

16. The combination as specified in claim 15 wherein said strip drive means includes a counter drum rotatably mounted on said frame, said counter drum including banks of pins extending outwardly from the periphery thereof in position to aline with and pass through said perforations in said elongated strip when said elongated strip lies in contact with said outer periphery of said drum; wherein said counter drum has a second flat belt pulley integral with one end thereof; and said flat belt extends between said first and second flat belt pulleys.

17. A machine for dispensing stamps from an elongated perforated strip of stamps wound into a roll; said machine including: a main frame; roll supporting means mounted with respect to said main frame; a drive shaft motor; motor energizing means; drive means operative to tend to move said strip through said machine whenever the motor is energized; said drive means including a slippage linkage having a plurality of frictionally drivably engaged elements movable with respect to each other; a counter drum rotatably mounted on said frame, said counter drum including rows of pins extending outwardly from the periphery thereof in position to align with and pass through said perforations in said elongated strip when said elongated strip lies in contact with said outer periphery of said drum; first means to prevent rotation of said drum and thereby to prevent feed of said elongated strip; second means to disable said first means; manually operable means for preselecting the number of stamps to be dispensed from said machine; means biasing said frictionally engaged elements to generate sufficient friction to cause said strip to be pulled through said machine; said drive motor, said manually operable means, said motor energizing means and said second means being operable at substantially the same time to cause said strip to move through said machine; and third means operable to stop said stamp strip precisely when all of the last stamp of said preselected number of stamps has moved through said machine.

References Cited by the Examiner
UNITED STATES PATENTS

| | | | |
|---|---|---|---|
| 2,845,266 | 7/1958 | Hempel | 226—135 |
| 2,964,313 | 12/1960 | Zeigle | 226—109 |
| 3,006,538 | 10/1961 | Deutsch | 226—109 X |

M. HENSON WOOD, JR., *Primary Examiner.*

RAPHAEL M. LUPO, *Examiner.*

C. AOUSSAT, J. N. ERLICH, *Assistant Examiners.*

UNITED STATES PATENT OFFICE
CERTIFICATE OF CORRECTION

Patent No. 3,229,880 January 18, 1966

Ewald A. Arp

It is hereby certified that error appears in the above numbered patent requiring correction and that the said Letters Patent should read as corrected below.

Column 16, line 53, for "htrough" read -- through --; column 18, line 42, after "drive" insert -- shaft --; column 20, line 44, after "means" insert -- being --.

Signed and sealed this 6th day of December 1966.

(SEAL)
Attest:

ERNEST W. SWIDER
Attesting Officer

EDWARD J. BRENNER
Commissioner of Patents